(12) United States Patent
Charikar

(10) Patent No.: US 7,158,961 B1
(45) Date of Patent: Jan. 2, 2007

(54) METHODS AND APPARATUS FOR ESTIMATING SIMILARITY

(75) Inventor: Moses Samson Charikar, Princeton, NJ (US)

(73) Assignee: Google, Inc., Mountain View, CA (US)

( * ) Notice: Subject to any disclaimer, the term of this patent is extended or adjusted under 35 U.S.C. 154(b) by 611 days.

(21) Appl. No.: 10/029,883

(22) Filed: Dec. 31, 2001

(51) Int. Cl.
  *G06F 7/04* (2006.01)
(52) U.S. Cl. ............................. 707/2; 707/102
(58) Field of Classification Search ........... 707/1–3, 707/5, 10, 100, 102, 104.1; 708/200, 422–424; 345/418, 419, 427; 382/10, 154, 181, 190, 382/191, 209, 217–220, 276–278
  See application file for complete search history.

(56) References Cited

U.S. PATENT DOCUMENTS

| | | | | |
|---|---|---|---|---|
| 5,067,152 | A * | 11/1991 | Kisor et al. | 348/422.1 |
| 5,101,475 | A * | 3/1992 | Kaufman et al. | 345/424 |
| 5,469,354 | A * | 11/1995 | Hatakeyama et al. | 707/3 |
| 5,612,865 | A * | 3/1997 | Dasgupta | 700/79 |
| 5,794,178 | A * | 8/1998 | Caid et al. | 704/9 |
| 5,806,061 | A * | 9/1998 | Chaudhuri et al. | 707/3 |
| 6,061,734 | A * | 5/2000 | London | 709/238 |
| 6,134,532 | A * | 10/2000 | Lazarus et al. | 705/14 |
| 6,349,296 | B1 * | 2/2002 | Broder et al. | 707/3 |
| 6,603,470 | B1 * | 8/2003 | Deering | 345/419 |

OTHER PUBLICATIONS

Moses Sampspn Charikar, "Algorithms for Clustering Problems", 2001, Stanford University, vol. 62/01-B of Dissertation Abstracts International.*

SRC Technical Note; 1997-015; Jul. 25, 1997; "Syntactic Clustering of the Web"; Andrei Z. Broder et al.; pp. 1-14; Digital Equipment Corporation http://gatekeeper.dec.com/pub/DEC/SRC/technical-notes/SRC-1997-015-html/.
"Similarity Search in High Dimensions via Hashing"; Aristides Gionis et al.; Department of Computer Science; Stanford University; pp. 518-529; 1999.
"Approximate Nearest Neighbors: Towards Removing the Curse of Dimensionality (preliminary version)"; Piotr Indyk et al.; Department of Computer Science; Stanford University; Jul. 21, 1999; pp. 1-13 and i-vii.
"Chapter 26—Improved approximation algorithms for network design problems"; M.X. Goemans et al.; pp. 223-232.
"Approximation Algorithms for Classification Problems with Pairwise Relationships: Metric Labeling and Markov Random Fields"; Jon Kleinberg et al.
"Scalable Techniques for Clustering the Web"; Taher H. Haveliwala et al.
"Efficient Search for Approximate Nearest Neighbor in High Dimensional Spaces"; Eyal Kushilevitz et al.; pp. 1-17.
"On the resemblance and containment of documents"; Andrei Z. Broder; Digital Systems Research Center; Palo Alto, CA; pp. 1-9.

* cited by examiner

*Primary Examiner*—Greta Robinson
*Assistant Examiner*—Harold E. Dodd, Jr.
(74) *Attorney, Agent, or Firm*—Harrity Snyder LLP

(57) ABSTRACT

A similarity engine generates compact representations of objects called sketches. Sketches of different objects can be compared to determine the similarity between the two objects. The sketch for an object may be generated by creating a vector corresponding to the object, where each coordinate of the vector is associated with a corresponding weight. The weight associated with each coordinate in the vector is multiplied by a predetermined hashing vector to generate a product vector, and the product vectors are summed. The similarity engine may then generate a compact representation of the object based on the summed product vector.

24 Claims, 4 Drawing Sheets

| coordinate | value |
|---|---|
| four | 1 |
| score | 1 |
| and | 1 |
| seven | 1 |
| years | 1 |
| ago | 1 |

| coordinate | value |
|---|---|
| four | 0.3 |
| score | 0.4 |
| and | 0.05 |
| seven | 0.3 |
| years | 0.4 |
| ago | 0.2 |

| Coordinate | Value | Hashing Vectors |
|---|---|---|
| four | 0.3 | (-4, 2, 6)  ~402 |
| score | 0.4 | (8, -9, -4)  ~403 |

401

404
Result Vector = ( -4 × 0.3, 2 × 0.3, 6 × 0.3)
+
(8 × 0.4, -9 × 0.4, -4 × 0.4)

= (2.0, 3.0, 0.2)

405
Similarity Sketch = 111

Fig. 4

METHODS AND APPARATUS FOR ESTIMATING SIMILARITY

BACKGROUND OF THE INVENTION

A. Field of the Invention

The present invention relates generally to similarity estimation, and more particularly, to calculating similarity metrics for objects such as web pages.

B. Description of Related Art

The World Wide Web ("web") contains a vast amount of information. Locating a desired portion of the information, however, can be challenging. Search engines catalog web pages to assist web users in locating the information they desire. Typically, in response to a user's request, the search engine returns references to documents relevant to the request.

From the search engine's perspective, one problem in cataloging the large number of available web pages is that multiple ones of the web documents are often identical or nearly identical. Separately cataloging similar documents is inefficient and can be frustrating for the user if, in response to a request, a list of nearly identical documents is returned. Accordingly, it is desirable for the search engine to identify documents that are similar or "roughly the same" so that this type of redundancy in search results can be avoided.

In addition to improving web search results, the identification of similar documents can be beneficial in other areas. For example, storage space may be reduced by storing only one version of a set of similar documents. Or, a collection of documents can be grouped together based on document similarities, thereby improving efficiency when compressing the collection of documents.

One conventional technique for determining similarity is based on the concept of sets. A document, for example, may be represented as a sub-set of words from a corpus of possible words. The similarity, or resemblance of two documents to one another is then defined as the intersection of the two sets divided by the union of the two sets. One problem with this set-based similarity measure is that there is limited flexibility in weighting the importance of the elements within a set. A word is either in a set or it is not in a set. In practice, however, it may be desirable to weight certain words, such as words that occur relatively infrequently in the corpus, more heavily when determining the similarity of documents.

Accordingly, there is a need in the art for improved techniques for determining similarity between documents.

SUMMARY OF THE INVENTION

Systems and methods consistent with the present invention address this and other needs by providing a similarity engine that generates compact representations of objects that can be compared to determine similarity between the objects.

In one aspect, the present invention is a method for generating a compact representation of an object. The method includes generating a vector corresponding to the object, each coordinate of the vector being associated with a corresponding weight and multiplying the weight associated with each coordinate in the vector by a corresponding hashing vector to generate a product vector. The method further includes summing the product vectors and generating the compact representation of the object using the summed product vectors.

A second method consistent with the present invention includes creating a similarity sketch for each of first and second objects based on the application of a hashing function to a vector representation of the first and second objects. Additionally, the method compares, on a bit-by-bit basis, the similarity sketches for the first and second objects, and generates a value defining the similarity between the first and second objects based on a correspondence in the bit-by-bit comparison.

Another aspect of the present invention is directed to a server that includes at least one processor, a database containing a group of objects, and a memory operatively coupled to the processor. The memory stores program instructions that when executed by the processor, cause the processor to remove similar objects from the database by comparing similarity sketches of pairs of objects in the database and removing one of the objects of the pair when the comparison indicates that the pair of objects are more similar than a threshold level of similarity. The processor generates the similarity sketches for each of the pair of objects based on an application of a hashing function to vector representations of the objects.

Yet another aspect of the invention is directed to a method for generating a compact representation of a first object. The method includes identifying a set of features corresponding to the object and generating, for each feature, a hashing vector having n coordinates. The hashing vectors are summed to obtain a summed vector, and an $n*x$-bit representation of the summed vector is obtained by calculating an x-bit value for each coordinate of the summed vector.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A and 3B illustrate exemplary object vectors; and

FIG. 4 is a diagram conceptually illustrating the calculation of a result vector for an exemplary object vector based on two corresponding hashing vectors.

DETAILED DESCRIPTION

The following detailed description of the invention refers to the accompanying drawings. The detailed description does not limit the invention. Instead, the scope of the invention is defined by the appended claims and equivalents.

As described herein, a similarity engine generates compact representations, called similarity sketches, for object vectors. The object vectors can be created for objects, such as document files. The similarity sketch for two different object vectors can be quickly and easily compared to generate an indication of the similarity between the two objects.

Figure 1:
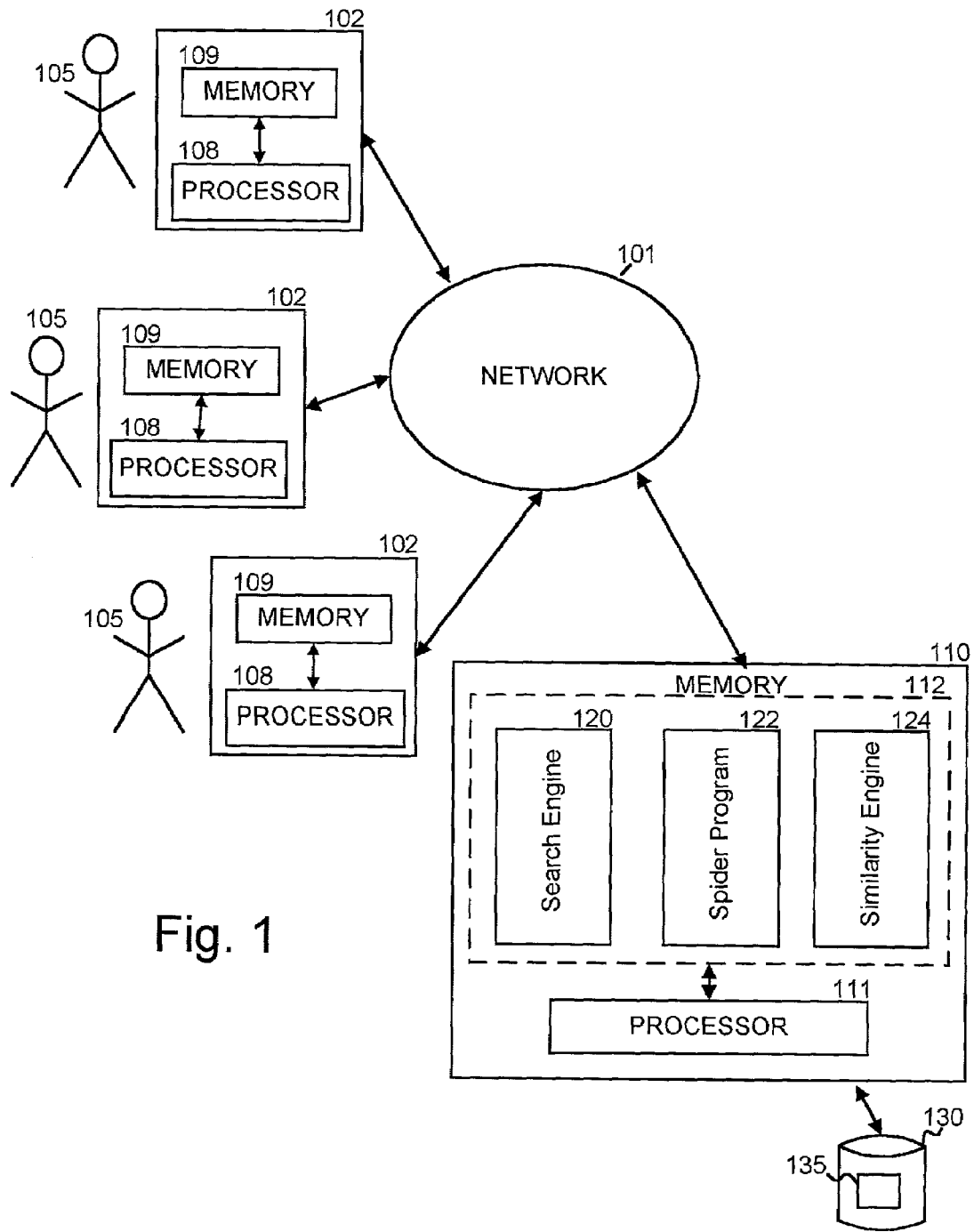
FIG. 1 is a diagram illustrating an exemplary system in which concepts consistent with the present invention may be implemented.

FIG. 1 is a diagram illustrating an exemplary system in which concepts consistent with the present invention may be implemented. The system includes multiple client devices 102, a server device 110, and a network 101, which may be, for example, the Internet. Client devices 102 each include a computer-readable medium 109, such as random access memory, coupled to a processor 108. Processor 108 executes program instructions stored in memory 109. Client devices 102 may also include a number of additional external or internal devices, such as, without limitation, a mouse, a CD-ROM, a keyboard, and a display.

Through client devices 102, users 105 can communicate over network 101 with each other and with other systems and devices coupled to network 101, such as server device 110.

Similar to client devices 102, server device 110 may include a processor 111 coupled to a computer readable memory 112. Server device 110 may additionally include a secondary storage element, such as database 130.

Client processors 108 and server processor 111 can be any of a number of well known computer processors, such as processors from Intel Corporation, of Santa Clara, Calif. In general, client device 102 may be any type of computing platform connected to a network and that interacts with application programs, such as a digital assistant or a "smart" cellular telephone or pager. Server 110, although depicted as a single computer system, may be implemented as a network of computer processors.

Memory 112 may contain a number of programs, such as search engine program 120, spider program 122, and similarity engine 124. Search engine program 120 locates relevant information in response to search queries from users 105. In particular, users 105 send search queries to server device 110, which responds by returning a list of relevant information to the user 105. Typically, users 105 ask server device 110 to locate web pages relating to a particular topic and stored at other devices or systems connected to network 101. The general implementation of search engines is well known in the art and therefore will not be described further herein.

Search engine program 120 may access database 130 to obtain results from a document corpus 135, stored in database 130, by comparing the terms in the user's search query to the documents in the corpus. The information in document corpus 135 may be gathered by spider program 122, which "crawls" web documents on network 101 based on their hyperlinks.

In one embodiment consistent with the principles of the present invention, memory 112 additionally includes similarity engine 124. Similarity engine 124 generates similarity information between documents in document corpus 135. More particularly, similarity engine 124 may generate a relatively small "sketch" (e.g., a 64 bit value) for each document in corpus 135 and may compare the sketches between pairs of documents. If two documents, based on their sketches, are more similar than a predefined similarity threshold, similarity generator 124 may, for example, remove one of the two documents from document corpus 135. In this manner, search engine program 120 is less likely to return redundant or overly similar results in response to user queries. Alternately, instead of removing documents from the corpus based on the similarity sketches, similarity generator 124 may remove duplicate documents "on the fly." In other words, search engine program 120 may generate a set of documents in response to a user query and similarity generator 124 may cull the generated set of documents based on similarity sketches.

Figure 2:
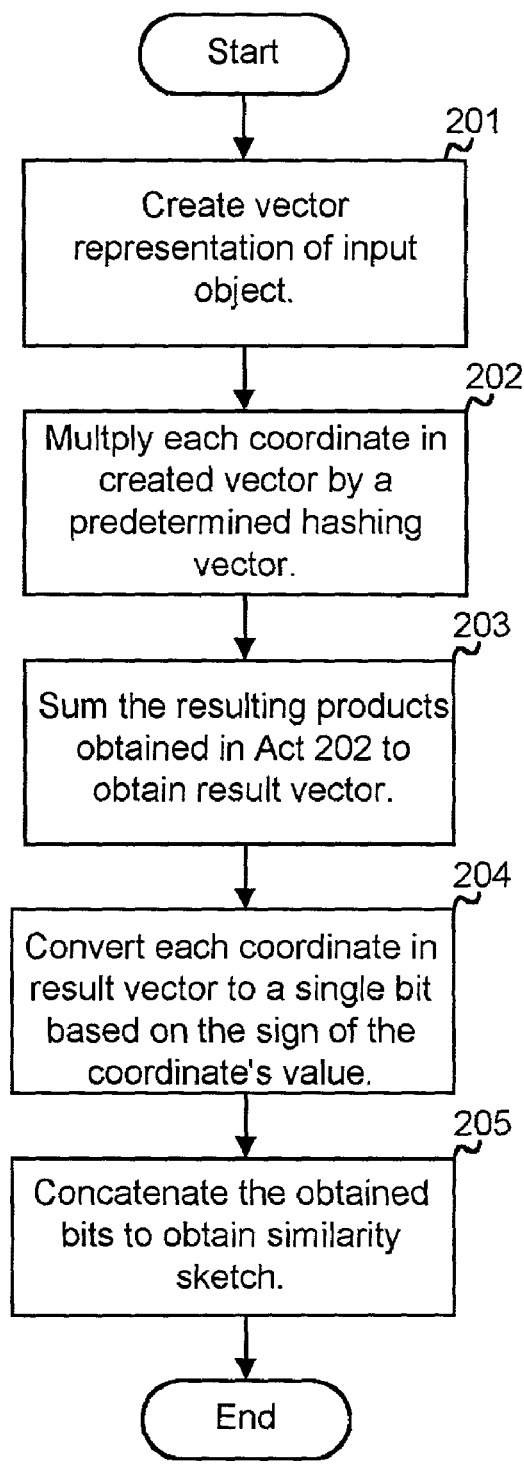
FIG. 2 is a flow chart illustrating methods consistent with principles of the present invention for generating similarity sketches.

FIG. 2 is a flow chart illustrating methods consistent with principles of the present invention for generating similarity sketches for objects by similarity engine 124. In general, similarity engine 124 processes objects, such as web documents, to generate the sketches. Sketches of different objects can be compared to generate a quantitative metric of the similarity of the objects.

To begin, similarity engine 124 creates a vector representation of the input object. (Act 201). The input object may be a document such as a web page. More generally, the object can be any item that contains a series of discrete elements, and the representation of the input object can be a set of associated features rather than a vector per se. The vector coordinates are indexed by the elements of the object. In the case of documents, for example, the elements may be the words in the document.

FIG. 3A illustrates an example of a vector 301 for the object phrase "four score and seven years ago." The vector for this phrase contains six non-zero coordinates corresponding to the six words in the phrase. Conceptually, the vector can be thought of as containing as many coordinates as there are elements in the universe of elements (e.g., the number of unique words in the corpus), with each coordinate other than those in the phrase having a value of zero.

In FIG. 3A, each non-zero coordinate is given an equal vector weight (i.e., it has the value one). More generally, however, different elements can be given different weights. This is illustrated in FIG. 3B, in which words that are considered "more important" are more heavily weighted in object vector 302. For example, "years" and "score," because they are less common words, may be given a higher weighting value, while "and" is given a low weight. In this manner, the object vector can emphasize certain elements in the similarity calculation while de-emphasizing others. In the implementation of FIG. 3B, valid values are in the range between zero and one.

The weights for an element can be calculated using any number of possible weighting formulas. In one implementation, for vectors associated with documents, the weight for a word is set as the number of occurrences of the word within the document divided by the number of documents in the corpus containing the word.

After constructing the object vector 301 or 302 for the object, similarity engine 124 multiplies every coordinate in the object vector by a corresponding predetermined hashing vector having a preset number of coordinates (dimensions), where each coordinate in the hashing vector corresponds to a number, such as a random number, provided that the same input object vector coordinate yields the same hashing vector coordinate. (Act 202). A different hashing vector may be used for each possible coordinate (e.g., word). The number of preset coordinates in the hashing vector corresponds to the size of the resulting sketch. For example, to produce a 64-bit sketch for each object, a 64-dimensional hashing vector would be chosen.

For a particular input vector coordinate, the corresponding hashing vector could be generated from a pseudo random number generator seeded based on the input vector coordinate (ignoring the actual value of the input vector coordinate). The values of the coordinates of the hashing vector could be selected based on the output of the pseudo random number generator so that the values are random numbers drawn from a chosen distribution. For example, coordinates could be drawn from the normal distribution with probability density function $$\frac{1}{\sqrt{2\pi}} e^{\frac{-x^2}{2}}.$$

Another possibility is to choose coordinates to be either +1 or −1 with equal probability. A hash function could be used to map input vector coordinates to hashing vectors directly. For example, a 64-bit hash value obtained from a hash function could be mapped to a 64-dimensional hashing vector by choosing the $i^{th}$ coordinate of the hashing vector to be +1 or −1 based on whether the $i^{th}$ bit in the hash value is 1 or 0.

The product vectors generated in Act 202 are summed for all elements in the object to generate a result vector having the same number of coordinates as each of the predetermined hashing vectors. (Act 203).

Stated more formally, the operations performed in Acts 202–203 generate the result vector based on a hashing function defined as, $$\vec{R} = \sum_i c_i \vec{v}_i$$

where $\vec{R}$ is the result vector, $c_1$ is the weight value for the $i^{th}$ coordinate (a scalar), $\vec{v}_i$ is the predetermined hashing vector for the $i^{th}$ coordinate in the object vector, and the sum is taken over all the possible coordinates in the object vector.

The result vector can be used as the similarity sketch for the object. Optionally, the result vector may be further simplified to obtain the similarity sketch by generating, for each coordinate in the resultant vector, a single bit corresponding to the sign of the coordinate's value. (Act 204). The generated bits are then concatenated together to form the object's sketch. (Act 205). In the above example, for a 64-coordinate hashing vector, and thus, a 64-coordinate result vector, the similarity sketch would be a 64-bit value.

When comparing the similarity sketches for two objects generated by Act 205, similarity generator 124 may create a similarity value based on a bit-by-bit comparison of the sketches. In one implementation, a final similarity measure between two sketches can be obtained by logically exclusive-ORing (XOR) the two sketch values and summing the complements of the individual result bits to yield a value between zero (not similar) and 64 (very similar) for a 64-bit similarity sketch. If the similarity measure is above a predetermined threshold (e.g., greater than 50), the two objects may be considered to be similar to one another.

FIG. 4 is a diagram conceptually illustrating the calculation of a result vector for an exemplary object vector 401 and two corresponding hashing vectors 402 and 403. In practice, object vectors are likely to be significantly more complex than object vector 401 and the hashing vectors are likely to contain more than the three coordinates illustrated in hashing vectors 402 and 403.

Object vector 401 contains two non-zero elements, "four" and "score," each associated with a weight value. Hashing vectors 402 and 403 each have three coordinates, which will thus yield a three-bit similarity sketch. Result vector 404 is the sum of hashing vectors 402 and 403 after being multiplied by the value of the corresponding coordinate in object vector 401. Similarity sketch 405 is derived from the signs of the three coordinates in result vector 404. As shown, because each of the three coordinate values is positive, the similarity sketch is "111."

The values of the coordinates in hashing vectors 402 and 403 can be chosen at random. For a large corpus (e.g., a million possible words) and a larger similarity sketch (e.g., 128 bits), such a large number of hashing vectors (i.e., one million), each made up of 128 random values, can be burdensome to store and subsequently access. Accordingly, the random numbers for each hash vector could be dynamically generated using a pseudo random number generator seeded with a value based on the hash vector's coordinate. Furthermore, if it is determined that two coordinates in the object vector are "similar", it may be desirable to make the hashing vectors similar for these two object vector coordinates. In this manner, one may incorporate information about the similarity of object vector coordinates into their associated hashing vectors.

Although the above description of similarity engine 124 generally describes a similarity engine operating in the context of web documents, the concepts described could also be implemented based on any object that contains a series of discrete elements.

As mentioned, similarity sketches generated by similarity engine 124 may be used to refine the entries in database 130 to reduce the occurrence of redundant or nearly redundant documents returned in response to a user's search query. The similarity sketches can be used in a number of other applications. For example, spider program 122, when crawling web sites, may use similarity engine 124 to determine sites that are substantial duplicates of one another. Mirror sites are one example of duplicate sites that occur frequently on the web. In future crawls, spider program 122 may more efficiently crawl the web by avoiding crawling the sites that are determined to be substantial duplicates.

As another example of the application of similarity engine 124, similarity engine 124 may generate object vectors for a web document based on the list of hyperlinks in the document. Accordingly, similarity engine 124 may develop similarity sketches based on a document's list of links.

As yet another example of the application of similarity engine 124, the similarity engine may operate on "snippets" of text associated with documents returned from a search query. A snippet is an abstraction of the document that is initially returned to a user in response to a search query. Based on the snippets, users select full documents to view. Similarity engine 124 may compare snippets from a search query and exclude those snippets and/or search results that exceed a similarity threshold.

As yet another example of the application of similarity engine 124, similarity engine 124 may quantitatively determine the similarity between two words or phrases based on the context surrounding those words or phrases from the document corpus. More specifically, similarity engine 124 may create an object vector for a word, such as "shop", based on the words within a certain distance (e.g., 10 words) of each occurrence of shop in the corpus. The coordinates of this object vector would be all the words in the corpus. The value for the coordinates may be, for example, the number of times the coordinate word occurs within the context distance. If, for example, the word "cart" occurs frequently in the document corpus within the selected context distance to the word "shop," then the value for "cart" would be relatively high in the object vector. Two different words with close similarity sketches, as determined by similarity engine 124, are likely to be used as synonyms in the corpus.

Similarity engine 124 may also be used outside of the context of web search engines. For example, a collection of objects may be grouped based on their similarity. Grouping objects in this manner may be used to gain increased compression ratios for the objects or to increase access speed from a storage medium.

The similarity sketches described above have a number of advantages. Because the similarity sketches are based on vector representations, different elements of the vectors can be given different weights, thus allowing vector elements to be more or less important than one another. In contrast, in conventional set-based similarity techniques, elements are simply either in a set or not in the set. Additionally, the sketches generated above are relatively compact compared to similarity measures generated with the conventional set-based techniques.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the preceding description generally discussed the operation of search engine 120 in the context of a search of documents on the world wide web, search engine 120 and similarity engine 124 could be implemented on any corpus. Moreover, while a series of acts have been presented with respect to FIG. 2, the order of the acts may be different in other implementations consistent with the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A computer-implemented method for generating a compact representation of a first object, comprising:
    (a) identifying a set of features corresponding to the first object;
    (b) generating for each feature a hashing vector having n coordinates;
    (c) summing the hashing vectors to obtain a summed vector; and
    (d) creating an n·x-bit representation of the summed vector by calculating an x-bit value for each coordinate of the summed vector, the n·x-bit representation of the summed vector defining the compact representation of the first object.

2. The computer-implemented method of claim 1, wherein the set of features is a vector.

3. The computer-implemented method of claim 1, wherein generating for each feature a hashing vector comprises:
    determining a weight associated with each feature; and
    multiplying each hashing vector by the weight determined for the corresponding feature.

4. The computer-implemented method of claim 1, wherein the object is a document.

5. The computer-implemented method of claim 4, wherein each feature is a word within the document.

6. The computer-implemented method of claim 1, wherein the object is a summary of another object.

7. The computer-implemented method of claim 1, wherein x is equal to 1.

8. The computer-implemented method of claim 1, wherein n is equal to 64.

9. The computer-implemented method of claim 1, further comprising:
    repeating acts (a)–(d) for a second object to create a second n·x-bit representation; and
    comparing the first and second n·x-bit representations to determine whether the first and second objects are similar.

10. The computer-implemented method of claim 9, further comprising discarding either one of the first or second objects.

11. The computer-implemented method of claim 1, further comprising:
    repeating acts (a)–(d) for m objects to create m n·x-bit representations; and
    grouping the m objects based on their corresponding n·x-bit representations.

12. The computer-implemented method of claim 11, further comprising compressing the objects by group.

13. The computer-implemented method of claim 1, wherein act (b) comprises generating for each feature a hashing vector having n coordinates, such that the hashing vectors are similar for similar features.

14. A computer-implemented method for generating a compact representation of an object, comprising:
    generating a vector corresponding to the object, each coordinate of the vector being associated with a corresponding weight;
    multiplying the weight associated with each coordinate in the vector by a corresponding hashing vector to generate a product vector;
    summing the product vectors to obtain a summed product vector; and
    generating a compact representation of the object using the summed product vectors.

15. The computer-implemented method of claim 14, wherein the weights are real numbers.

16. The computer-implemented method of claim 15, wherein the weights include values between zero and one.

17. The computer-implemented method of claim 14, wherein the object is a web document.

18. The computer-implemented method of claim 17, wherein the coordinates in the vector correspond to words in the web document.

19. The computer-implemented method of claim 18, further comprising:
    assigning the weights for each coordinate of the vector as the number of occurrences of the word within the web document divided by the number of web documents contained in a collection of web documents that contain the word.

20. The computer-implemented method of claim 14, wherein values in the hashing vectors are generated using a pseudo random number generator seeded based on the coordinate corresponding to the hashing vector.

21. The computer-implemented method of claim 14, wherein each bit is generated based on the sign of the value of the coordinate.

22. A system for generating a compact representation of an object, comprising:
    means for generating a vector corresponding to the object, each coordinate of the vector being associated with a corresponding weight;

means for multiplying the weight associated with each coordinate in the vector by a corresponding hashing vector to generate a product vector;

means for summing the product vectors to obtain a summed product vector; and means for generating the compact representation based on the summed product vector.

23. A computer-readable medium storing instructions for causing at least one processor to perform a method that generates a compact representation of an object, the method comprising:

generating a vector corresponding to the object, each coordinate of the vector being associated with a corresponding weight;

multiplying the weight associated with each coordinate in the vector by a corresponding hashing vector to generate a product vector;

summing the product vectors; and generating the compact representation of the object using the summed product vector.

24. A computer-implemented method for generating a compact representation of an object, comprising:

generating an object vector corresponding to the object;

generating a hashing vector corresponding to each coordinate of the object vector;

summing the hashing vectors to obtain a summed vector;

calculating at least one bit corresponding to each coordinate of the summed product vector; and generating a compact representation of the object by concatenating the calculated bits.

* * * * *